United States Patent

[11] 3,581,497

| [72] | Inventor | Frank C. Krumholz |
| | | Owatonna, Minn. |
| [21] | Appl. No. | 856,133 |
| [22] | Filed | Sept. 8, 1969 |
| [45] | Patented | June 1, 1971 |
| [73] | Assignee | Owatonna Manufacturing Company, Inc. |
| | | Owatonna, Minn. |

[54] CONTROL APPARATUS FOR HYDRAULIC DRIVE MECHANISM
8 Claims, 7 Drawing Figs.

[52] U.S. Cl. .................................................. 60/53,
180/6.48, 74/469
[51] Int. Cl. .................................................. B62d 11/04
[50] Field of Search .................................................. 180/6.48;
74/469; 60/52VSP, 53

[56] References Cited
UNITED STATES PATENTS
3,114,424  12/1963  Voreaux et al. .................. 180/6.3

| 3,323,607 | 6/1967 | Futamata | 60/52VSP |
| 3,362,493 | 1/1968 | Davis et al. | 180/6.48 |
| 3,385,387 | 5/1968 | McKeown | 74/471 |
| 3,431,993 | 3/1969 | Case | 60/52VSP |
| 3,461,669 | 8/1969 | Kanengieter | 60/53A |

*Primary Examiner*—Edgar W. Geoghegan
*Attorney*—Merchant and Gould

ABSTRACT: Means for controlling operation of a pair of independent hydraulic drive units for a vehicle, each including a pump and cooperating motor at least one of which is of variable displacement, each unit having a control arm movable to vary said displacement to provide varying forward and rear speeds and a neutral stationary condition of said motors. A control lever is operatively connected to said control arms and is bodily movable by speed control means to control the speed of said motors in common, said control lever being mounted for pivotal movements, imparted thereto by steering means, to differentially control the motors.

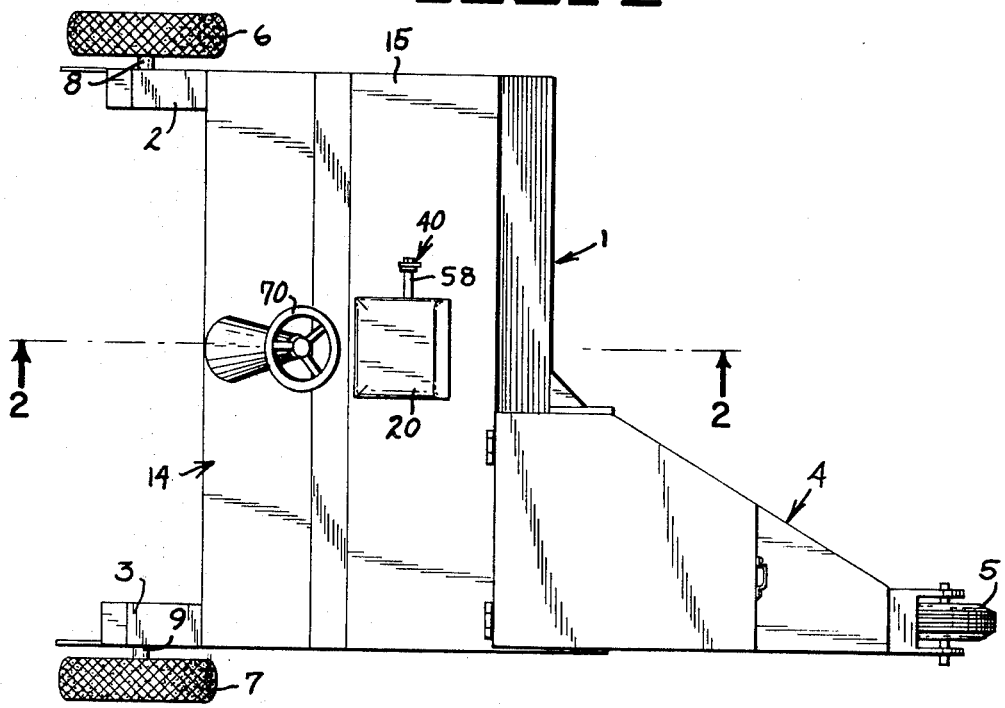
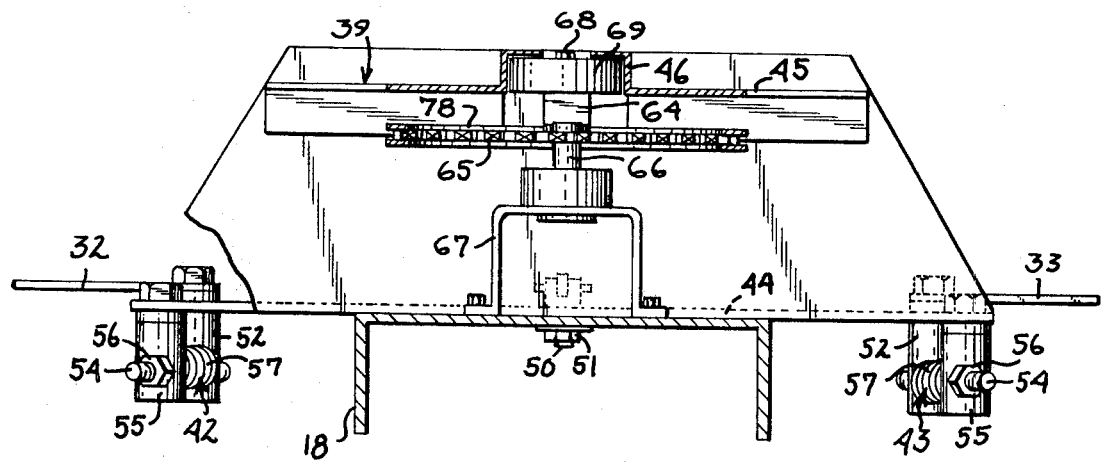

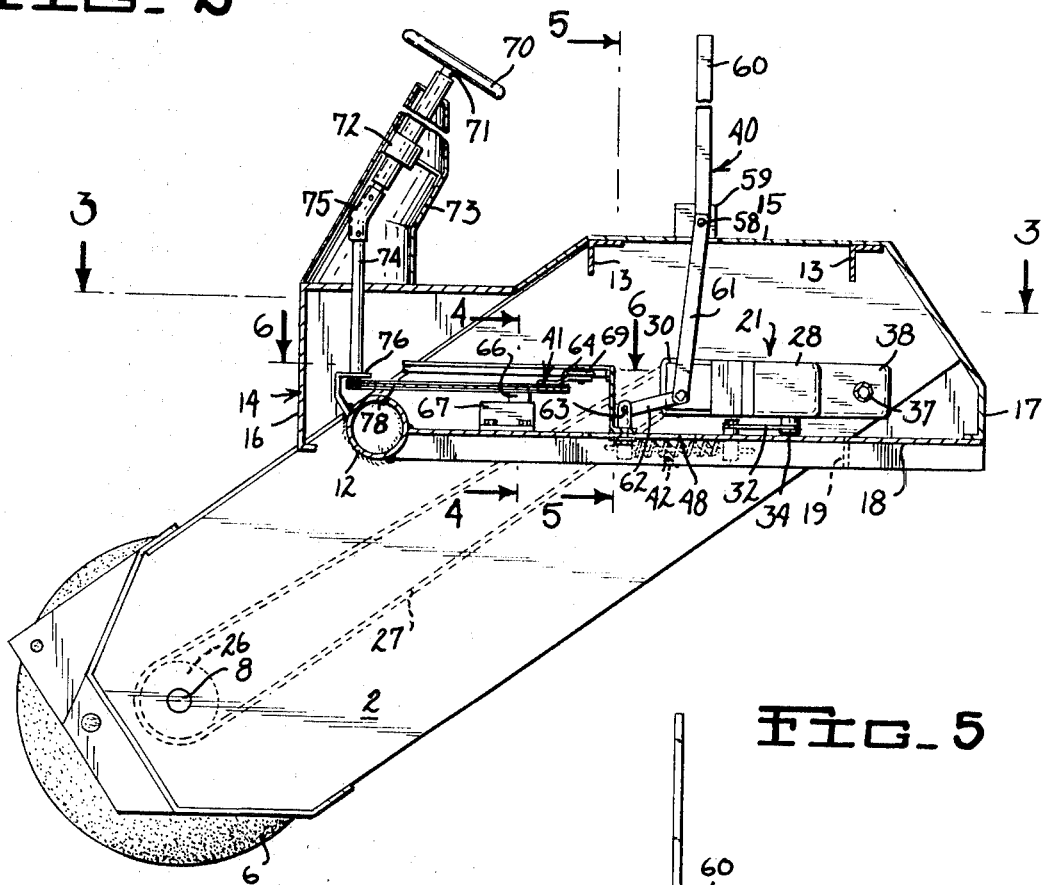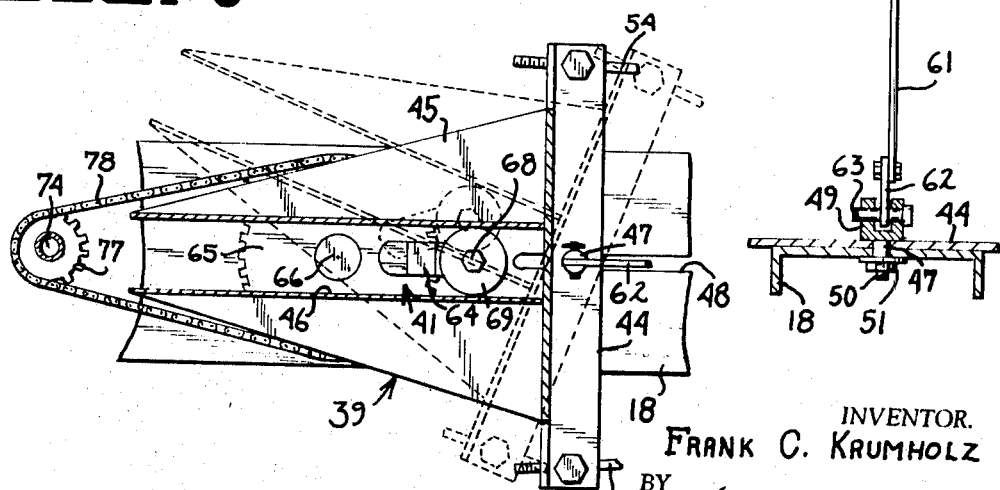

INVENTOR.
FRANK C. KRUMHOLZ
BY
Merchant & Gould
ATTORNEYS

3,581,497

CONTROL APPARATUS FOR HYDRAULIC DRIVE MECHANISM

BACKGROUND OF THE INVENTION

The present invention is in the nature of an improvement over the control apparatus disclosed and claimed in U.S. Pat. No. 3461669 to Glenn G. Kanengieter, assignor to the assignee company of this invention. In the vehicle of the above patent and other generally similar fluid pressure driven vehicles wherein driving and steering of the vehicle is obtained by independent motors each driving a rotary member at an opposite side of the vehicle, control of the drive motors is obtained by fluid pressure operated control devices, many of which are costly to produce and difficult to maintain in proper adjustment.

SUMMARY OF THE INVENTION

An important object of this invention is the provision of a highly simplified and positive control apparatus for a vehicle having independent rotary driving means at opposite sides thereof and wherein steering of the vehicle is obtained by differential in speeds between the individual driving means, or by reversing the direction of rotation of one driving means relative to that of the other thereof, the driving means having individual control arms.

Another object of this invention is the provision of a control apparatus by means of which the rate of steering movement of the vehicle is reduced in proportion to the increase in forward speed of the vehicle.

To the above ends, I provide a control lever having a first lever arm operatively connected at each of its opposite ends to a different one of said control arms, and a second lever arm normal to said first lever arm; a speed control member; and a steering crank rotatable on a fixed axis. The control lever is mounted on the vehicle for bodily movements in opposite directions toward and away from the steering crank axis, and is pivotally movable in all positions of its bodily movement on an axis fixed on the control lever intermediate the opposite ends of the first lever arm and parallel to the fixed crank axis. The steering crank operatively engages the second lever arm in all positions of bodily movement thereof for imparting pivotal movements to the control lever, the effective length of the second lever arm changing responsive to bodily movement of the control lever. The arrangement is such that the effective length of the second lever arm, or the distance between the point of engagement thereof with the steering crank, increases as the control lever is moved bodily in a direction to increase the speed of the vehicle.

Another feature of this invention resides in a linkage connection between the control lever and the hydraulic unit control arm whereby, when the control lever is moved to a maximum forward speed position, steering movements of the control member can be made to retard the speed of rotation of one of the drive units relative to the maximum speed of the other unit, to provide for steering of the vehicle at the maximum forward speed thereof. Further, when the control lever is disposed in a neutral position, the arrangement is such that pivotal movement of the control lever in either direction will cause the drive units to rotate in opposite directions relative to each other, to impart steering movement to the vehicle about its own axis or about a vertical axis disposed intermediate the drive unit.

DESCRIPTION OF THE DRAWING

FIG. 1 is a view in top plan of a vehicle incorporating the control apparatus of this invention;

FIG. 2 is an enlarged fragmentary transverse section taken substantially on the line 2-2 of FIG. 1, some parts being removed;

FIG. 4 is an enlarged fragmentary section taken on the line 4-4 of FIG. 2;

FIG. 5 is an enlarged fragmentary section taken substantially on the line 5-5 of FIG. 2;

FIG. 6 is an enlarged horizontal section taken on the line 6-6 of FIG. 2; and

DETAILED DESCRIPTION OF THE PREFERRED EMBODIMENT

Figure 3:
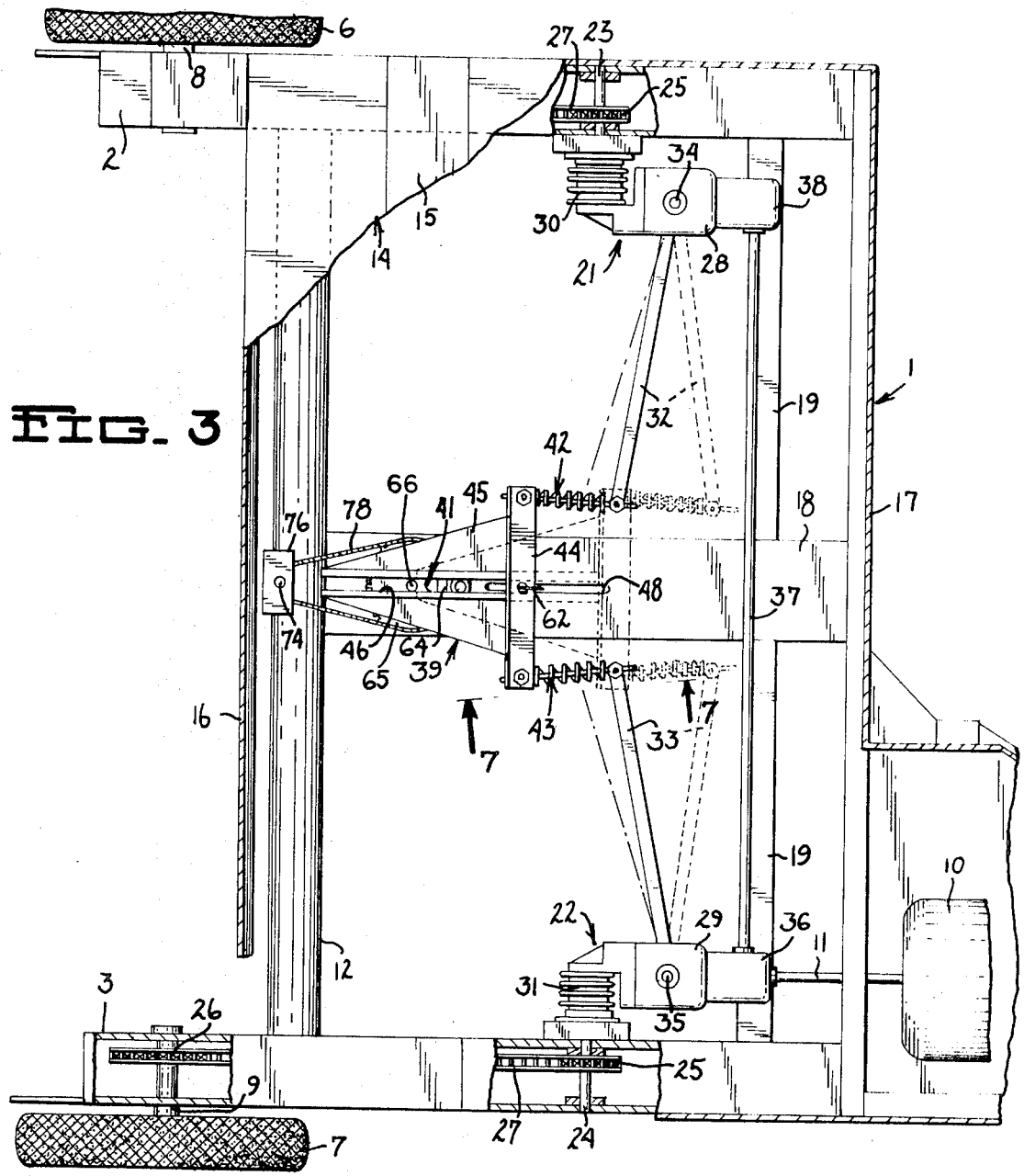
FIG. 3 is a fragmentary view partly in top plan and partly in section, taken substantially on the line 3-3 of FIG. 2.

In the drawings, a three wheeled vehicle is shown as comprising a generally rectangular frame 1 including a pair of laterally spaced forwardly and downwardly sloping housings 2 and 3, and a hollow boom structure 4 extending rearwardly and supported at its rear end by a pneumatic tire equipped caster wheel 5. The front end of the frame 1 is supported by a pair of drive wheels 6 and 7 that are mounted on shafts 8 and 9 respectively that are journaled in respective ones of the housings 2 and 3 at the lower forward end portions thereof. The vehicle is of the type generally shown in the above identified Kanengieter patent and in U.S. Pat. No. 3,151,429, issued to Gorden Dyrdahl, the frame 1 being adapted to have mounted thereon an agricultural implement, such as a swather, windrower, or other implements, not shown. As shown diagrammatically in FIG. 3, the boom structure 4 has mounted therein a prime mover in the nature of a conventional internal combustion engine 10 having a forwardly projecting drive shaft 11. The frame 1 further includes a rigid transverse tubular frame member 12, a pair of upper transverse frame members 13, a transverse housing 14 having a top wall 15 and front and rear walls 16 and 17 respectively, a generally horizontal forwardly and rearwardly extending channel beam 18 and a pair of aligned cross frame members 19. The tubular member 12, transverse frame members 13 and housing 14 are rigidly secured at their opposite ends to the housings 2 and 3, by welding or other suitable means, the channel beam 18 being welded at its front end to the tubular frame member 12 and at its rear end to the rear wall 17 of the transverse housing 14. The transverse frame members 13 and cross frame members 19 are preferably made from structural angle iron, the members 19 having outer ends suitably secured to the housings 2 and 3 and inner ends welded or otherwise rigidly secured to opposite sides of the channel beam 18. An operator's seat 20 is shown in FIG. 1 as being mounted on the top wall 15 of the transverse housing 14.

The drive wheels 6 and 7 are independently driven by respective hydraulic drive units 21 and 22 having respective output shafts 23 and 24 operatively connected to the wheel shafts 8 and 9 respectively by drive sprocket wheels mounted fast on the output shafts 23 and 24, driven sprocket wheels 26 mounted fast on the wheel shafts 8 and 9, and endless link chains 27 entrained over the sprocket wheels 25 and 26, see FIGS. 2 and 3.

The hydraulic units 21 and 22 are substantially identical, one thereof being right hand and the other thereof being left hand. The hydraulic units 21 and 22 comprise pumps 28 and 29 respectively and hydraulic motors 30 and 31 respectively hydraulically connected to their respective pumps 28 and 29. For the purpose of the present example, the pumps 28 are of the variable displacement type and are provided with pivotally mounted respective control arms 32 and 33 that are movable between full forward, neutral and reverse positions, as shown by dotted, full and dot-dash lines respectively in FIG. 3. The pumps 28 and 29, and the motors 30 and 31 are of the type which utilize rotating cylinders and axially movable pistons that engage swash plates, the hydraulic units 21 and 22 being preferably of he type manufactured and sold by Vickers, Inc., Division of Sperry Rand Corporation of Detroit, Michigan, under their Model TY-1515, well known in the industry. Displacement of the pumps 28 and 29 is varied by angular displacement of the swash plates not shown, within the pump, between zero and maximum displacement. The swash plates may be angularly displaced to a point wherein the pump displacement may be varied between zero and a given maximum displacement in a reverse direction, whereby to impart reverse rotation to the motors 30 nd 31. Although not shown, it may be assumed that the control arms 32 and 33 are connected to their respective swash plates by means of displacement control shafts 34 and 35 respectively.

The pumps 28 and 29 are driven, preferably at constant speed, by the prime mover or engine 10, the drive shaft 11 thereof being connected to the pump 29 by suitable means not shown but disposed within a gear box 36. A transverse shaft 37 is operatively connected to the drive shaft 11 by gearing, not shown, within the gear box 36 and to the pump 28 by gearing, not shown, but contained within a gear box 38 mounted on the pump 28.

The control apparatus of this invention, for controlling operation of the hydraulic units 21 and 22, comprises a control lever indicated generally at 39, a speed control lever indicated generally at 40, steering crank means indicated generally at 41, and a pair of rigid links 42 and 43. The control lever 39 comprises a first lever arm 44 that extends generally transversely of the frame 1 and a bifurcated second lever arm 45 disposed generally normal to the first lever arm 44 and which extends generally forwardly therefrom, defining a longitudinal channel 46. The control lever 39 is mounted on the beam 18 for pivotal movements thereon on a generally vertical axis and for bodily movements longitudinally of the beam 18, by a pivot shaft 47 journaled in the first lever arm 44 at its longitudinally central portion and which extends downwardly through an elongated channel or slot 48 in the beam 18, the channel or slot 48 extending longitudinally of the beam 18. As shown in FIG. 5, the pivot shaft 47 is provided with an enlarged head 49 that overlies the lever arm 44, and a screw threaded lower end 50 on which is screw threaded a washer equipped retaining nut 51 for holding the control lever 39 on the beam 18 for said longitudinal sliding and pivotal movements of the lever 39.

Figure 7:
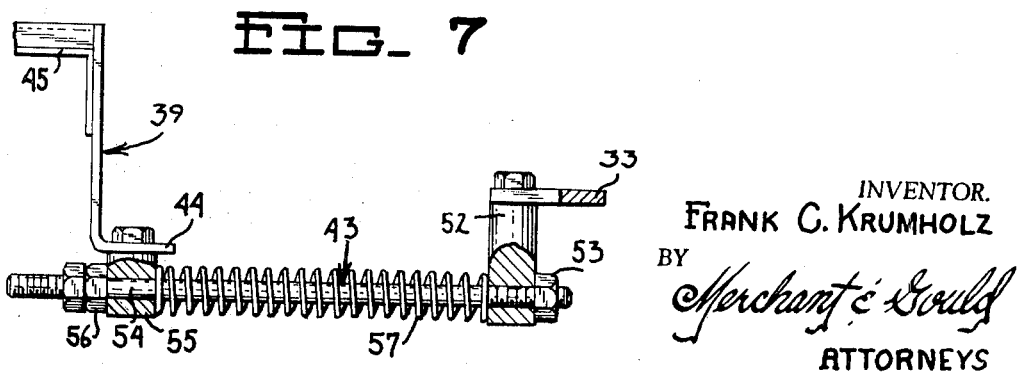
FIG. 7 is an enlarged fragmentary detail partly in side element and partly in section, taken on the line 7-7 of FIG. 3.

As shown in FIG. 3, the control arms 32 and 33 extend generally transversely of the frame 1 toward each other, the links 42 and 43 extending generally forwardly and rearwardly of the frame 1. The rear end portions of the links 42 and 43 are screw threaded into the lower end portions of generally vertically disposed stub shafts 52, and are locked in place by means of lock nuts 53, see particularly FIG. 7. The stub shafts 52 are each pivotally secured to the inner end of a different one of the control arms 32 and 33, whereby to pivotally connect the links 42 and 43 to the control arms 32 and 33 respectively. The front end portions of the links 42 and 43 are axially slidably mounted in transverse openings 54 in a pair of stub shafts 55 each pivotally mounted to an opposite end of the first lever arm 44. Each link 42 and 43 is provided with a lock nut equipped stop nut 56 screw threaded thereonto limit sliding movement of each link 42 and 43 in one direction relative to its respective stub shaft 55. A pair of coil compression springs 57 are mounted one each on a different one of the links 42 and 43, and interposed between the stub shafts 52 and 55 to yieldingly urge the stop nuts 56 into engagement with their respective stub shafts 55.

The speed control lever 40 comprises a shaft 58 that is journaled in spaced bearing brackets 59 on the top housing wall 15, an upwardly projecting handle lever arm 60 rigidly secured to one end portion of the shaft 58 at one side of the driver's seat 20, and a depending lever arm 61 secured to the shaft 58 adjacent its opposite end. At its lower end, the depending lever arm 61 is pivotally connected to one end of a rigid link 62, the opposite end of which is pivotally mounted on the enlarged head 49 of the pivot shaft 47, as indicated at 63, see particularly FIG. 5. Swinging movement of the handle lever arm 60 in a forward direction moves the control lever 39 bodily in a rearward direction to swing both control arms 32 and 33 toward their dotted line full forward speed position of FIG. 3. Conversely, rearward swinging movement of the upper lever arm 60 imparts forward movement to the control lever 39 and control arms 32 and 33 toward the reverse drive position thereof shown by dot and dash lines in FIG. 3.

The steering crank means 41 comprises a crank arm 64 rigidly mounted on and extending radially with respect to a sprocket wheel 65 that is journaled on a vertically disposed shaft 66 carried by a mounting bracket 67 bolted or otherwise rigidly secured to the channel beam 18 below the second lever arm 45. At its radially outer end, the crank arm 64 is provided with a crank pin 68 on which is journaled a roller 69 that engages the second lever arm 45 within the channel 46 defined thereby. As shown particularly in FIG. 3, the axis of the fixed shaft 66 intersects the longitudinal axis of the channel or slot 48 in the channel beam 18. A steering wheel 70 is disposed forwardly of the oprator's seat 20, and is connected to the upper end of a steering shaft 71 that is journaled in a tubular bearing 72 mounted within a hollow pedestal 73 welded or otherwise rigidly secured to the top housing wall 15. The lower end of the steering shaft 71 is connected to a vertically disposed shaft extension 74 by a flexible coupling 75, the shaft extension 74 being journaled in the top housing wall 15 and in bracket 76 rigidly mounted on the tubular frame member 12. A sprocket wheel 77 is mounted on the lower end of the shaft extension 74 and has entrained thereover an endless link chain 78 also entrained over the sprocket wheel 65. With reference particularly to FIG. 6, it will be seen that the sprocket wheel 65 is of considerably larger diameter than the sprocket wheel 77 so as to provide a substantial reduction in speed of rotation of the sprocket wheel 65 relative to that of the sprocket wheel 77.

The above described control apparatus provides a steering control over the vehicle which varies in steering ratio in accordance with the speed of the vehicle, steering being effected by providing a speed differential between the drive wheels 6 and 7. When the vehicle is being driven forwardly in a straight line, the axes of the fixed shaft 66, crank pin 68 and pivot shaft 47 are disposed in a common plane, as shown in FIG. 3 and by full lines in FIG. 6. As above mentioned, speed of the vehicle is controlled by using the speed control lever 40 to move the control lever 39 forwardly or rearwardly of the frame 1. When it is desired to turn the vehicle, the steering wheel 70 is rotated in the direction of steering movement. As an example, when it is desired to turn the vehicle to the left when moving forwardly or when the vehicle is stationary, the operator turns the steering wheel 70 to the left to impart rotation to the sprocket wheel 65 crank arm 64 carried thereby in a clockwise direction with respect to FIGS. 3 and 6. This clockwise rotation of the sprocket wheel 65 imparts pivotal movement to the control lever 39 in a counterclockwise direction as indicated by dotted lines in FIG. 6, whereby to move the control arm 32 for the drive unit 21 in a speed increasing direction while moving the control arm 33 of the drive unit 22 in a speed decreasing direction. When the vehicle is in a stationary condition, with the control arms 32 and 33 in a neutral position as shown by full lines in FIG. 3, steering movement of the steering wheel 70 will rotate the control lever 39 on the axis of the pivot shaft 47 in a direction to impart rotation to its respective drive wheel in one direction, while simultaneously moving the other control leer to cause its respective drive unit to impart rotation to its corresponding drive wheel in the opposite direction. Thus, the vehicle will turn on a vertical axis generally centrally between the drive wheels 6 and 7. As the speed control lever 40 is moved in a direction to increase the speed of the vehicle, the control lever 39 is moved bodily rearwardly with respect to the axis of the fixed shaft 66, whereby to increase the distance between the roller equipped crank pin 68 and the axis of the pivot shaft 47, thus increasing the effective length of the second lever arm 45. As this effective length increases, the amount of angular movement of the control lever 39 decreases with a given amount of angular rotation of the crank arm equipped sprocket wheel 65, thus decreasing the steering rate of the vehicle. This arrangement aids materially in preventing the vehicle from tipping due to excessive speed thereof during turning of corners or negotiating curves during road travel. The cross frame members 19 provide abutment members engaging the rear ends of the rigid links 42 and 43 when the vehicle is moving at full forward speed. When turning the vehicle at full forward speed, the control lever 39 is pivotally moved as above described. Assuming that a left turn is to be negotiated at full forward speed, the steering wheel 70 is rotated in a manner to impart pivotal movement to the control lever 39 about the axis of its pivot shaft 47 in a counterclockwise direction with respect to FIG. 3. In view of the fact that the rear end of the link 42 is in abutting engagement with its respective cross frame member 19, pivotal movement of the control lever 39 in a counterclockwise direction will cause the outer end of the lever arm 44 slidably engaging the link 42 to swing rearwardly, compressing the spring 57 mounted on the link 42. The opposite end of the lever arm 44 will swing forwardly, engagement of the stub shaft 55 with the stop nut 56 on the link 43 causing the lever arm 33 to be moved in a direction to decrease the speed of rotation of the drive wheel 7 while the drive wheel 6 is rotating at its maximum speed in a forward direction. In making a turn in the opposite direction at full speed, the rear end of the link 43 will remain in abutting engagement with its respective cross frame member 19, with its respective spring 57 being compressed while the opposite link 42 will be moving in a direction to decrease the speed of its respective drive wheel 6.

It will be appreciated that, when the vehicle is driven in a reverse direction, the control arms 32 and 33 disposed as indicated by dot and dash lines in FIG. 3, the pivot shaft 47 will be disposed in quite closely spaced relationship to the crank pin 68 whereby the effective length of the second lever arm 39 is very short. However, the arrangement is such that the maximum speed of the vehicle in a reverse direction is quite slow, so there is little, if any, possibility of tipping the machine when steering in reverse.

What I claim is:

1. Control apparatus for a hydraulic drive mechanism for a vehicle including a frame and a pair of rotary drive members at opposite sides of the frame, said drive mechanism including a pair of hydraulic pump and motor units, one of the pump and motor of each unit being of variable displacement to vary the speed of said rotary drive members between full forward, zero speed, and reverse direction, said units having individual control arms mounted thereon for swinging movements between full forward, neutral and reverse drive positions, and means for driving the pumps of said units, said apparatus comprising:
    a. steering crank means rotatably mounted on said frame on a fixed axis;
    b. a control lever;
    c. mounting means mounting said control lever on said frame for bodily reciprocating movements in a given direction transversely of said fixed crank means axis and generally in the direction of swinging movement of said control arms, and for pivotal movements on an axis fixed relative to said control lever and parallel to said fixed crank means axis;
    d. crank pin means on said crank means;
    e. said lever including a lever arm operatively engaging said crank pin means in all positions of said bodily movement of the lever for swinging movements of said lever on said axis fixed relative thereto responsive to rotation of said crank means, the effective length of said lever arm varying in accordance with said bodily movement of the lever;
    f. speed control means for imparting said bodily reciprocating movement to the lever;
    g. and linkage operatively connecting said lever to said control arms.

2. The control apparatus defined in claim 1 in which said control lever includes a first lever arm extending generally transversely of said direction of bodily movement of the lever and a second lever arm generally normal to said first lever arm, said first lever arm having opposite ends each connected to a different one of said control arms by said linkage, said mounting means comprising a pivot shaft disposed generally centrally between said opposite ends.

3. The control apparatus defined in claim 2 in which said second lever arm defines a channel extending longitudinally thereof for reception of said crank pin means, said crank pin means being relatively movable longitudinally of said channel responsive to said bodily movement of the control lever.

4. Control apparatus defined in claim 2 in which said linkage comprises, a pair of rigid links each having opposite ends pivotally connected to a different end of said first lever arm and its respective one of said control arms and each longitudinally slidable relative to one of said lever arms and respective control arm, stop means limiting longitudinal sliding movements of said link in one direction, and yielding means urging each of said links in the opposite direction of sliding movement thereof.

5. The control apparatus defined in claim 4 characterized by an abutment member on said frame operatively engaging said links when said control arms are moved to the limit of full forward speed controlling movement thereof by speed control means imparted movement to said control lever in one direction, said yielding means comprising a pair of springs each associated with a different one of said links and yieldable selectively to permit pivotal steering movement of said control lever, when said links operatively engage said abutment member.

6. The control apparatus defined in claim 1 in which said steering crank means comprises a crank element, characterized by a rotor steering shaft and a pair of cooperating driving and driven speed reduction elements the former of which is mounted on said steering shaft, the crank element being mounted on said driven speed reduction element.

7. The control apparatus defined in claim 1 in which said control lever includes a first lever arm extending generally transversely of said direction of bodily movement of the lever and a second lever arm generally normal to said first lever arm, said first lever arm having opposite ends each connected to a different one of said control arms by said linkage, said frame defining a mounting channel extending longitudinally of said direction of bodily movement of the lever, said mounting means comprising a pivot shaft journaled on said control lever and extending transversely of said channel and slidable longitudinally therein.

8. The control apparatus defined in claim 7 in which said second lever arm defines a channel extending longitudinally thereof for reception of said crank pin means, said crank pin means being relatively movable longitudinally of said second lever arm channel responsive to said bodily movement of the control lever.